(12) United States Patent
Haimer

(10) Patent No.: US 7,024,786 B2
(45) Date of Patent: Apr. 11, 2006

(54) MULTI-COORDINATE SENSING MEASURING DEVICE

(75) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 27 days.

(21) Appl. No.: 10/481,173

(22) PCT Filed: Jun. 18, 2001

(86) PCT No.: PCT/EP01/06846

§ 371 (c)(1),
(2), (4) Date: May 19, 2004

(87) PCT Pub. No.: WO02/103282

PCT Pub. Date: Dec. 27, 2002

(65) Prior Publication Data

US 2004/0194331 A1    Oct. 7, 2004

(51) Int. Cl.
*G01B 5/12* (2006.01)

(52) U.S. Cl. .......................................... 33/556; 33/559

(58) Field of Classification Search ................. 33/556, 33/558, 558.3, 559, 503, 557, 560, 561
See application file for complete search history.

(56) References Cited

U.S. PATENT DOCUMENTS 4,752,166 A * 6/1988 Lehmkuhl ................... 409/127

(Continued)

Primary Examiner—Christopher W. Fulton
Assistant Examiner—Amy R. Cohen
(74) Attorney, Agent, or Firm—Scott D. Wofsy; Edwards Angell Palmer & Dodge LLP

(57) ABSTRACT

A multicoordinate sensing measuring device is proposed in which a sensing lever (5) that is resiliently spring-pretensioned in a resting position in a housing (3) can be displaced along a measuring axis (7) and can be pivoted transversely to the measuring axis (7). A connecting piece (25) is guided in a movable manner in the direction of the measuring axis (7) on a guide surface (23) of the housing (3). The sensing lever carries along the connecting piece (25) via a linkage (31, 33) when the sensing arm (5) is displaced in the direction of the measuring axis (7) as well as when the sensing arm is deflected in the direction of the measuring axis (7). A measuring device (21) detects the position of the connecting piece (25) relative to the housing (3). The connecting piece (25) and the guide surfaces (23) form bearing surfaces for balls of the ball bearing arrangement (27) where the bearing surface of at least one of these components—connecting piece (25) and housing (3)—can be elastically deflected transversely to the bearing surface and clamps the balls (65) free of play between the bearing surfaces. The connecting piece (25) or/and the housing (3) are made of aluminium or an aluminium alloy and are coated with a comparatively thin hard-anodized layer into which the balls (65) can wear a track groove. Such a sensing measuring device can be manufactured with relatively large manufacturing tolerances and is nevertheless able to guide the connecting piece (25) in a movable manner essentially free of play in the housing (3).

18 Claims, 1 Drawing Sheet

U.S. PATENT DOCUMENTS

Figure 1:
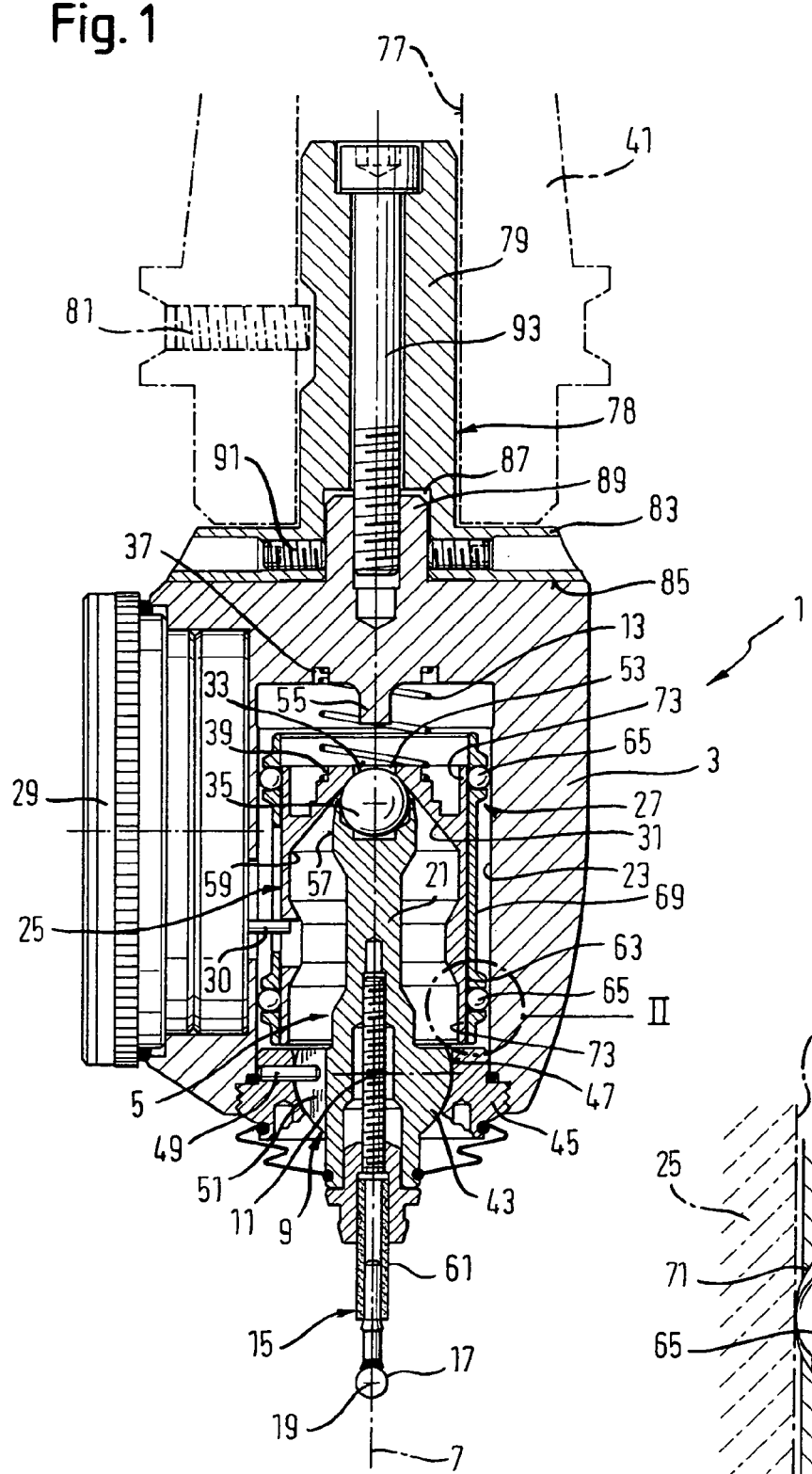

| | | | |
|---|---|---|---|
| 4,942,671 A * | 7/1990 | Enderle et al. | 33/559 |
| 5,322,304 A * | 6/1994 | Rivin | 279/103 |
| 5,365,673 A * | 11/1994 | Haimer et al. | 33/559 |
| 5,394,618 A * | 3/1995 | Morz | 33/559 |
| 5,509,211 A * | 4/1996 | Ernst | 33/561 |
| 6,087,919 A * | 7/2000 | Golinelli | 336/136 |
| 6,612,791 B1 * | 9/2003 | Haimer | 409/232 |
| 6,760,977 B1 * | 7/2004 | Jordil et al. | 33/558 |
| 6,760,980 B1 * | 7/2004 | Golinelli | 33/832 |

* cited by examiner

MULTI-COORDINATE SENSING MEASURING DEVICE

The invention concerns a multicoordinate sensing measuring device which allows distance measurements in the direction of a measuring axis as well as transversely thereto.

A multicoordinate sensing measuring device of this type is known from DE 195 02 840 A1. The sensing measuring device has a housing and a sensing lever that can be displaced relative to the housing in the direction of the measuring axis and that is guided on the housing such that it can be turned to all sides around a pivoting point located on the measuring axis by means of a universal joint. The sensing lever is spring-pretensioned in a resting position and has a sensing arm protruding from the housing whose free sensing end defines a sensing reference point located on the measuring axis in the resting position of the sensing lever. A connecting arm is linked to the sensing arm on the same axis whose free end that is distal to the sensing end relative to the pivoting point forms an outer control surface that is, in the resting position of the sensing lever, rotationally symmetrical relative to the measuring axis with an essentially convex generatrix. A connecting piece is guided in the housing such that it can be displaced in the direction of the measuring axis and the position of said connecting piece relative to the housing is detected by a measuring device. The connecting piece has a through opening which widens towards the sensing end and forms an inner control surface which is rotationally symmetrical relative to the measuring axis and on which the outer control surface of the connecting arm rests. The control surfaces form a linkage which connects the connecting arm with the connecting piece in such a manner that the connecting arm carries the connecting piece in the direction of the measuring axis when the sensing arm is moved in the direction of the measuring axis and when the sensing arm is deflected around the pivoting point of the connecting piece.

Other multicoordinate sensing measuring devices which primarily differ from the above-mentioned sensing measuring device in the construction of the linkage are known from DE 41 00 323 A1, U.S. Pat. No. 3,660,906, U.S. Pat. No. 5,355,589 and GB 2 094 979 A.

In the known multicoordinate sensing measuring devices the restoring forces of the sensing lever are produced by a spring that is tensioned between the coupling piece that can be displaced in the direction of the measuring axis and the housing, and said spring pretensions the sensing arm in its resting position via the linkage. Consequently manufacturing tolerances not only of the control surfaces of the linkage but also manufacturing tolerances of the guide surfaces of the connecting piece affect the measuring accuracy of the sensing measuring device. Hence the guide surfaces of conventional sensing measuring devices have to be manufactured, and in particular ground, very precisely which considerably complicates the manufacturing process and considerably increases the manufacturing costs for the sensing measuring device especially when the dial gauge that determines or/and indicates the distance is coupled to this connecting piece.

It is known from the sensing measuring device described in GB 2 094 979 A that a connecting piece displaceable relative to the housing in the direction of the measuring axis can be guided in a linear ball bearing in order to reduce measuring errors due to frictional hysteresis. The linear ball bearing has bushing sleeves that are separate from the housing and considerably increases the manufacturing costs if it has to meet the precision requirements.

The object of the invention is to create a multicoordinate sensing measuring device which can be manufactured with comparatively large manufacturing tolerances but nevertheless allows precise distance measurements.

The invention starts from a multicoordinate sensing measuring device which comprises:
 a housing,
 a sensing lever that can be displaced in the direction of a measuring axis relative to the housing, that is spying-pretensioned in a resting position and is guided such that it can be turned to all sides by means of a universal joint relative to the housing around a pivoting point located on the measuring axis, said sensing lever having a sensing arm protruding from the housing whose free sensing end defines a sensing reference point located on the measuring axis, in the resting position of the sensing lever,
 a connecting piece that can be displaced in a guided manner on a guide surface arrangement of the housing in the direction of the measuring axis,
 a linkage that couples the sensing lever with the connecting piece and carries the connecting piece along in the direction of the measuring axis when the sensing arm is displaced in the direction of the measuring axis as well as when the sensing arm is deflected around the pivoting point and
 a measuring device which detects the position of the connecting piece relative to the housing.

On the basis of such a sensing measuring device the above object is achieved according to the invention by the fact that the connecting piece and the guide surface arrangement of the housing have bearing surfaces for balls of a ball bearing-arrangement where the bearing surface of at least one of the components—connecting piece and housing—can be deflected elastically transversely to the bearing surface and clamps the balls between the bearing surfaces without play. The bearing surface that is preferably formed by a flexible integral wall area of one of these components compensates for any tolerance-related play of the balls and allows the bearing surfaces to be manufactured by a relatively economic manufacturing process such as turning or rubbing. It is, for example, not necessary to precision polish the bearing surfaces for the balls.

In a preferred embodiment the wall area forming the bearing surface is formed as a radially elastic section of a tube and in particular of the connecting piece that is concentric to the measuring axis. The bearing surfaces of the connecting piece and of the guide surface arrangement of the housing are expediently formed as circular cylindrical surfaces that are concentric to one another. In this connection it has proven to be simple for the manufacturing process when the radially elastic wall area of the connecting piece that forms the bearing surface is provided in the area of at least one axial end of the connecting piece and forms a section of a tube cylinder that protrudes freely in the direction of the measuring axis with preferably a uniform wall thickness. Such sections of the tube cylinder are expediently provided in the area of both axial ends of the connecting piece to form the bearing surfaces.

In order to maintain constant and predeterminable bearing and rolling properties of the balls, the balls of the ball bearing arrangement are preferably rotatably held in a ball cage that can be moved in the direction of the measuring axis between the bearing surfaces of the connecting piece and housing. The ball cage preferably guides at least two rows of balls extending circumferentially and spaced axially which are located especially in the area of the two axial ends of the connecting piece. This allows maintenance of a relatively large distance between only two ball guiding areas of the connecting piece which enhances the tilting stability of the connecting piece and thus improves the measuring accuracy.

The ball cage can be a cylindrical bushing that is concentric to the measuring axis and has one respective radial through hole in its bushing wall to separately guide each individual ball. The through holes are advantageously radially narrowed on one side so that the balls are secured in the through holes against falling out which simplifies the assembly of the sensing measuring device.

It is known that the housing and the connecting piece of a sensing measuring device can be manufactured from aluminium or an aluminium alloy in which case precision surfaces are usually provided in the form of a relatively thick hard-anodized layer which protects them permanently from damage and wear. It surprisingly turned out that the tolerances in the manufacture of the sensing measuring device can be designed to be relatively large and hence the manufacturing costs can be kept low when at least the bearing surface of the connecting piece and/or the housing made of aluminium or an aluminium alloy is coated with a hard-anodized surface layer of less than 10 µm and in particular less than 6 µm. Such a hard-anodized surface layer is substantially thinner than the layers that have been previously used to protect the surface of such aluminium components. Such surfaces when used as roller paths for ball bearings are still so soft that the balls of the ball bearing arrangement can automatically roll a trough-shaped path during use. As a result the balls themselves create a path bed and automatically compensate for manufacturing tolerances. This idea cannot only be used for the sensing measuring devices elucidated above with elastically deflectable ball bearing surfaces, but can also be used for sensing measuring devices in which both pairs of the bearing surfaces of the ball bearing are essentially non-elastic. Hence the idea of thin hard-anodized surface layers is itself of inventive significance.

An embodiment of the invention is further elucidated in the following on the basis of a figure.

Figure 2:
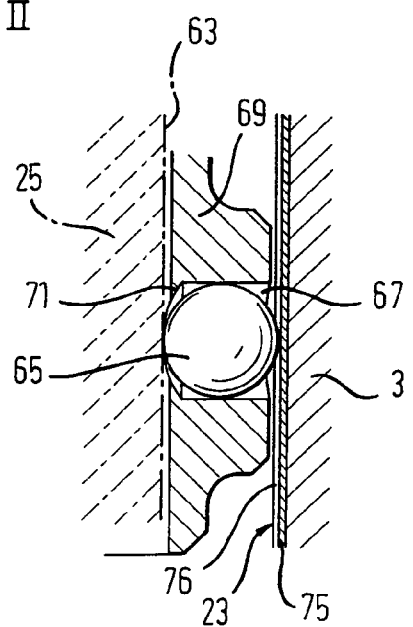

FIG. 1 shows an axial longitudinal section through a multicoordinate sensing measuring device and FIG. 2 shows a detail II from FIG. 1.

The sensing measuring device that is generally denoted 1, comprises a housing 3 in which a sensing lever that is generally denoted 5 is displaceably guided in the direction of a measuring axis 7 defined by the housing 3. The sensing lever 5 is also guided by the housing 3 such that it can be turned to all sides around a pivoting point 11 located on the measuring axis 7 by means of a universal joint which is in this case in the form of a ball joint 9 and is spring-pretensioned in the resting position shown in the figure by a return spring 13 in a manner that is elucidated in more detail in the following. The sensing lever 5 has a sensing arm 15 which protrudes from the housing and whose free sensing end 17 formed by a sphere defines a sensing reference point 19 located on the measuring axis 7 in the resting position of the sang lever 5. In relation to the pivoting point 11, a connecting arm 21 of the sensing lever 5 extends in the opposite direction to the sensing arm 15 into a circular cylindrical guide opening 23 of the housing 3 that is centric to the measuring axis 7. An essentially sleeve-shaped connecting piece 25 is guided in the guide opening 23 by means of a ball bearing arrangement generally denoted 27, that is elucidated in more detail in the following, such that it can be displaced in the direction of the measuring axis 7. A dial gauge 29 held on the housing 3 detects the position of the connecting piece 25 relative to the housing 3 and, for this purpose, is provided with a connecting pin 30 which engages in a hole of the connecting piece 25. As in the present case, the dial gauge 29 can be a mechanical length gauge; but other length measuring sensors that can detect the magnitude of the position of the connecting piece 25 relative to the housing 3 are also suitable such as electronic dial gauges or measuring transducers which generate signals according to the position.

In the area of the end that is axially distant from the pivoting point 11, the connecting piece 25 has an inner control surface 31 in the form of a truncated spherical surface with a straight-line generatrix with which it rests against a convex outer control surface 33 of the sensing lever 5 formed at the free end of the connecting arm 21. The inner control surface 31 is rotationally symmetrical to the measuring axis 7, whereas the outer control surface 33 is rotationally symmetrical to the straight-line through the sensing reference point 19 and the pivoting point 11 that coincide with the measuring axis 7 in the resting position of the sensing lever 5. The outer control surface 33 has a circle segment generatrix which in the present case is formed by a ball 35 attached to the free end of the connecting arm 21. However, the external control surface 33 can also be designed such that its circle segment-shaped generatrix has a centre of circle that is eccentric relative to the said straight-line. The return spring 13 one end of which is guided in a circular groove 37 at the bottom of the guide opening 23 and the other end of which is guided on a circular shoulder 39 of the connecting piece 25, pretensions the connecting piece 25 towards the sensing end 17 and also provides an abutment contact pressure of the juxtaposed control surfaces 31, 33. Instead of the linkage formed by the control surfaces 31, 33, other variants of linkages can also be provided.

In operation the sensing measuring device 1 is held in a machine tool or in a measuring device or such by means of a steeple-angled shaft indicated at 41. During a positioning movement of the sensing end 17 in the direction of the measuring axis 7 resulting from a measuring operation, the connecting arm 21 carries along the connecting piece 25 which in turn adjusts the dial gauge 29. When the sensing end 17 makes a positioning movement transversely to the measuring axis 7, the connecting arm 21 swivels around the pivoting point 11 defined by the ball joint 9. The control surfaces 31, 33 which glide past one another along their generatrices upon this rotating movement of the connecting arm translate the rotating movement of the sensing lever 5 into an axial movement of the sleeve-shaped connecting piece 25, such that the dial gauge 27 measures the radial distance of the sensing reference point 19 from the measuring axis 7. The said design of the control surfaces 31, 33 allows the radial distance between the sensing reference point 19 and the measuring axis 7 to be translated in a linearly proportional 1:1 ratio into the axial positioning travel of the connecting piece 25 caused by the rotation of the sensing lever 5.

The ball joint 9 has a joint ball 43 which is central relative to the pivoting point 11 and is an integral part of the connecting arm 21, and rests in a joint cup 45 that borders the guide opening 23 towards the sensing end 17. The joint cup 45 is screwed into the housing 3 and extends further distal to the sensing end 17 in a cylindrical guide 47 which guides the joint ball 43 radially to the measuring axis 7 during an axial displacement movement of the sensing lever 5. The sensing lever 5 is secured against overtwisting around the measuring axis 7 by provision of a pin 49 on the joint cup 45 in an axis-normal plane enclosing the pivoting point 11 in the resting position of the sensing lever 5, said pin engaging in a slit 51 extending in an axial longitudinal sectional plane of the sensing lever 5 in the ball joint 43.

The sensing arm 15 protruding from the housing 3 may for example be accidentally subject to impact stress during measuring operations or the sensing arm 15 may be deflected axially or radially to the limits of its travel. For an axial stroke limitation of the movement of the sensing lever 5, the connecting piece 25 has a centric through-hole 53 adjoining the free end of the connecting lever 21 into which a centric projection lug 55 projecting from the bottom of the guide hole 23 of the housing engages and come to abutment at the ball 35. Striking forces acting axially on the sensing end are conveyed in this manner directly into the housing and are not picked up by the control surfaces 31, 33. The radial stroke movement of the sensing arm 5 is limited by a stop surface 57 which can strike a circular cylindrical inner stop surface 59 of the connecting piece 25 which axially laterally adjoins the inner control surface 31. A further protection of the control surfaces 31, 33 and the dial gauge 27 is made possible by a frangible member 61 of the sensing arm 15 in the form of a ceramic sleeve.

The connecting piece 25 has a circular cylindrical outer jacket 63 which forms a bearing surface formed integrally by the connecting piece 25 for balls 65 of the ball bearing arrangement 27. The balls of the ball bearing arrangement 27 are on the other hand supported by the circular cylindrical guide opening 23 of the housing 3 which is coaxial to the measuring axis 7 and thus to the circumferential jacket 63 and likewise forms a bearing surface. The balls 65 are arranged in two rows extending in circumferential direction each in the area of the axial ends of the connecting piece 25 and, as shown best in FIG. 2, are each individually guided in allocated through-holes 67 of a ball cage that can be displaced in the direction of the measuring axis 7. The through-holes 67 are tapered 71 towards the connecting piece 25 which secures the balls 65 in the through-holes 67 when the ball cage 69 as such has already been inserted into the guide opening 23 before the connecting piece 25 has been mounted.

The jacket surface 63 of the connecting piece 25 and the inner jacket of the guide opening 23 can be manufactured with relatively large tolerances for example by turning or rubbing. In order to nevertheless essentially exclude a radial guiding play between the connecting piece 25 and the housing 3, the connecting piece 25 in the area of its radial ends and thus in the displacement movement range of the balls 65, is in the form of relatively thin-walled and thus radially elastically deflectable tube sections 73 which, if the diameter of the balls 65 is chosen to be sufficiently large, press them radially outwards against the inner jacket of the guide opening 23. The tube sections 73 have a uniform wall thickness in the circumferential direction as well as in the axial direction and thus ensure a uniform loading of all balls 65.

The connecting piece 25 and also the housing 3 are composed of aluminium or an aluminium alloy and are coated at least in the surface areas forming the bearing surfaces for the balls 65 with a hard oxide layer of a thickness of less than 10 µm, for example 3 to 5 µm. Such a layer that is shown in 75 on an exaggerated scale for the housing 3 and is also provided on the connecting piece 25, is sufficiently resilient to allow the balls 65 to roll a trough shape into the protective layer 75 composed of the equally relatively soft aluminium material of the housing 3 or the connecting piece 25. In this manner closely fitting track grooves 76 are worn automatically during use into the be surfaces of the housing 3 and the connecting piece 25 which also ensure that the connecting piece 25 is guided in a displaceable manner and protected against twisting. In this manner the connecting piece 25 in the housing 3 can be guided exactly without play despite relatively large tolerances in the manufacture.

The axis of the steeply tapered shaft 41 must extend on the same axis as the measuring axis 7 defined by the other components of the sensing measuring device 1. In order to be able to compensate for errors in alignment, the housing 3 is attached to the steeply tapered shaft 41 by means of an adapter 78 which allows an adjustment on the measuring axis 7 of the housing 3 parallel to the axis and relative to the axis of the steeply tapered shaft 41. The adapter 78 has a shaft 79 sitting with a snug fit in a centric through-hole 77 of the steeply tapered shaft 41 and is exchangeably held on the steeply tapered shaft 41 by means of a clamping screw indicated by 81. The shaft 79 carries a ring flange 83 between the steeply tapered shaft 41 and the housing 3 which has a flat contact surface 85 that is exactly perpendicular to the axis of the steeply tapered shaft 41 for the housing provided with a flat counter surface. A centering opening 87 is sunk into the contact surface 85 into which a centering pin 89 protruding from the housing 3 engages with radial play. At least three radial adjusting screws 91 distributed around the circumference of the ring flange 83 allow a radial adjustment of the housing 3 that is movably guided on the contact surface 85. A centric fastening screw 93 holds the housing 3 on the adapter 78. In order to radially adjust the housing 3 relative to the steeply tapered shaft 41, the screw 93 is firstly slightly tightened in order to somewhat tension the housing 3 against the contact surface 91; after the adjustment the adjusting screws 91 fix the housing 3 in the desired position until the screw 93 is tightened from the end of the steeply tapered shaft 41 that is distal to the housing.

What is claimed is:

1. Multicoordinate sensing measuring device, comprising:
   a) a housing;
   b) a sensing lever being spring-pretensioned in a resting position that can be displaced relative to the housing in the direction of a measuring axis and is guided by means of a universal joint such that it can be turned to all sides relative to the housing around a pivoting point located on the measuring axis and having a sensing arm protruding from the housing whose free sensing end defines a sensing reference point located on the measuring axis, in the resting position of the sensing lever;
   c) a connecting piece guided on a guide surface arrangement of the housing displacably in the direction of the measuring axis;
   d) a linkage that couples the sensing lever with the connecting piece and carries the connecting piece along in the direction of the measuring axis when the sensing arm is displaced in the direction of the measuring axis as well as when the sensing arm is deflected around the pivoting point; and
   e) a measuring device which detects the position of the connecting piece relative to the housing and
   wherein the connecting piece and the guide surface arrangement of the housing have bearing surfaces for balls of a ball bearing-arrangement where the bearing surface of at least one of the connecting piece and the housing can be deflected elastically transversely to the bearing surface and holds the balls clamped between the bearing surfaces without play.

2. Multicoordinate sensing measuring device as claimed in claim 1, wherein the bearing surface of one of said connecting piece and housing is provided on a flexible, integral wall area of this component.

3. Multicoordinate sensing measuring device as claimed in claim 2, wherein the wall area forming the bearing surface is formed of a radially elastic tube section that is concentric to the measuring axis.

4. Multicoordinate sensing measuring device as claimed in claim 3, wherein the bearing surfaces of the connecting piece and of the guide surface arrangement of the housing are provided as mutually concentric, circular cylindrical surfaces and the elastic bearing surface is provided on a radially elastic wall area of the connecting piece.

5. Multicoordinate sensing measuring device as claimed in claim 4, wherein the radially elastic wall area of the connecting piece that forms the bearing surface is provided in the area of at least one axial end of the connecting piece and is designed as a section of a tube cylinder that protrudes freely in the direction of the measuring axis.

6. Multicoordinate sensing measuring device as claimed in claim 5, wherein the section of the tube cylinder has a uniform wall thickness in at least the area thereof that is used as the bearing surface.

7. Multicoordinate sensing measuring devices as claimed in claim 6, wherein sections of the tube cylinder forming the bearing surfaces are provided in the area of both axial ends of the connecting piece.

8. Multicoordinate sensing measuring device as claimed in claim 7, wherein the balls of the ball bearing arrangement are preferably rotatably held in a ball cage that can be moved in the direction of the measuring axis between the bearing surfaces of the connecting piece and of the housing.

9. Multicoordinate sensing measuring device as claimed in claim 8, wherein the ball cage guides at least two rows of balls extending circumferentially and spaced axially from one another.

10. Multicoordinate sensing measuring device as claimed in claim 9, wherein the rows of balls are located in the area of both axial ends of the connecting piece.

11. Multicoordinate sensing measuring device as claimed in claim 10, wherein the ball cage is in the form of a cylindrical bushing that is concentric to the measuring axis and has one respective radial through-hole in its bushing wall to separately guide each individual ball.

12. Multicoordinate sensing measuring device as claimed in claim 11, wherein each of the through-holes is radially narrowed on one radial side and in particular on the side adjacent to the connecting piece so that the ball is secured in the through-hole against falling out.

13. Multicoordinate sensing measuring device as claimed in claim 12, wherein the sensing lever additionally comprises a connecting arm whose free end that is distal to the sensing end relative to the pivoting point forms an outer control surface of a linkage, with an essentially convex generatrix and in particular a circle section generatrix, that is rotationally symmetrical to the measuring axis in the resting position of the sensing lever and wherein the connecting piece has a recess that widens and is open towards the sensing end and forms an inner control surface of the linkage, especially in the form of a truncated conical surface with a straight-line generatrix, which is rotationally symmetric to the measuring axis and against which the outer control surface of the connecting arm abuts.

14. Multicoordinate sensing measuring device as claimed in claim 13, wherein the housing is held on a clamping shaft and wherein the housing and the clamping shaft have contact surfaces associated to one another and perpendicular to the measuring axis and are fixed together by at least one clamping screw which extends in the direction of the measuring axis, and wherein the housing or the clamping shaft have a centering pin that is centric to the measuring axis of this part which pin engages with radial play in a centering opening of the other part and that at least three adjusting screws that can be adjusted relative to the centering pin radially to the measuring axis are distributed around the circumference of the centering opening.

15. Multicoordinate sensing measuring device as claimed in claim 1, wherein the connecting piece or/and the guide surface arrangement of the housing are made of aluminium or an aluminium alloy and form bearing surfaces for balls of the ball bearing arrangement and wherein the bearing surface of at least one of the connecting piece and the housing is provided with a hard-anodized surface layer having a thickness of less than 10 μm and in particular of less than 6 μm.

16. Multicoordinate sensing measuring device as claimed in claim 15, wherein the connecting piece and the housing are entirely made of aluminium or an aluminium alloy.

17. Multicoordinate sensing measuring device as claimed in claim 15, wherein the bearing surface of the connecting piece and of the housing are manufactured by turning or rubbing.

18. Multicoordinate sensing measuring device as claimed in claim 15, wherein the balls of the ball bearing arrangement are oversized relative to the distance between the bearing surface of the connecting piece and of the housing when new, in such a manner that they roll tracks into the bearing surfaces during operation.

* * * * *